United States Patent
Lee et al.

(10) Patent No.: US 10,507,954 B2
(45) Date of Patent: Dec. 17, 2019

(54) WATER STORAGE TANK BLADDER, MANUFACTURING METHOD THEREFOR, WATER STORAGE TANK INCLUDING BLADDER, AND WATER TREATMENT APPARATUS INCLUDING WATER STORAGE TANK

(71) Applicant: COWAY CO., LTD., Chungcheongnam-do (KR)

(72) Inventors: Jong-Hwan Lee, Seoul (KR); In-Du Choi, Seoul (KR); Jung-Hwan Lee, Seoul (KR); Woo-Jin Joo, Seoul (KR); Hyun-Soo Shin, Seoul (KR); Tae-Seong Kwon, Seoul (KR); Hyoung-Min Moon, Seoul (KR)

(73) Assignee: Coway Co., Ltd (KR)

( * ) Notice: Subject to any disclaimer, the term of this patent is extended or adjusted under 35 U.S.C. 154(b) by 82 days.

(21) Appl. No.: 15/528,302

(22) PCT Filed: Nov. 11, 2015

(86) PCT No.: PCT/KR2015/012108
§ 371 (c)(1),
(2) Date: May 19, 2017

(87) PCT Pub. No.: WO2016/080697
PCT Pub. Date: May 26, 2016

(65) Prior Publication Data
US 2017/0327273 A1   Nov. 16, 2017

(30) Foreign Application Priority Data

Nov. 20, 2014   (KR) .................. 10-2014-0162970
Nov. 20, 2014   (KR) .................. 10-2014-0162971
(Continued)

(51) Int. Cl.
*F16L 55/04*   (2006.01)
*B65D 25/16*   (2006.01)
(Continued)

(52) U.S. Cl.
CPC .............. *B65D 25/16* (2013.01); *B29C 49/56* (2013.01); *B29K 2023/00* (2013.01);
(Continued)

(58) Field of Classification Search
CPC ........ B65D 25/16; B65D 77/06; B65D 83/00; B29C 49/02; B29C 49/56; B29K 2023/00;
(Continued)

(56) References Cited

U.S. PATENT DOCUMENTS 5,606,996 A  *  3/1997   Sugimura  ............. F16L 55/053
                                                    138/26
5,799,827 A  *  9/1998   D'Andrade  ............... B05B 1/34
                                                    222/212
(Continued)

FOREIGN PATENT DOCUMENTS

EP          0070699   *  1/1983   ............. B65D 77/06
EP          1 234 654      8/2002
(Continued)

OTHER PUBLICATIONS

The listed items were cited by the European Patent Office in a counterpart application, namely Appln. No. 15860889.3-1706. The European Search Report dated Dec. 14, 2017 is attached hereto.
(Continued)

*Primary Examiner* — Andrew T Kirsch
*Assistant Examiner* — Elizabeth J Volz
(74) *Attorney, Agent, or Firm* — The Farrell Law Firm, P.C.

(57) ABSTRACT

Disclosed are a water storage tank bladder, a manufacturing method therefor, the water storage tank including the blad-
(Continued)

der, and a water treatment apparatus including the water storage tank. According to one embodiment of the present invention, the water storage tank bladder used in the water storage tank to receive and store water and discharge the stored water has a lower side of which the thickness can be thicker than the thickness of the upper side of the bladder and thicker than the thickness of the lateral sides of the bladder.

15 Claims, 15 Drawing Sheets

(30) Foreign Application Priority Data

Nov. 20, 2014 (KR) .................. 10-2014-0162972
Nov. 20, 2014 (KR) .................. 10-2014-0162973

(51) Int. Cl.
*B29C 49/56* (2006.01)
*B29K 23/00* (2006.01)
*B29L 31/00* (2006.01)
*C02F 1/00* (2006.01)

(52) U.S. Cl.
CPC ......... *B29L 2031/712* (2013.01); *C02F 1/001* (2013.01); *C02F 2201/004* (2013.01)

(58) Field of Classification Search
CPC .......... B29L 2022/025; B29L 2031/712; C02F 1/001; C02F 2201/004
USPC .......................... 220/495.06, 565, 720, 723
See application file for complete search history.

(56) References Cited

U.S. PATENT DOCUMENTS

| | | | |
|---|---|---|---|
| 8,763,843 B2* | 7/2014 | Marett | ............... E03B 3/03 |
| | | | 137/255 |
| 2013/0228233 A1* | 9/2013 | Haws | ............ G05D 23/1306 |
| | | | 137/337 |

FOREIGN PATENT DOCUMENTS

| | | | | |
|---|---|---|---|---|
| JP | 7-174231 | | 7/1995 | |
| JP | 07174231 | * | 7/1995 | ............. F16J 3/02 |
| JP | 2008513220 | | 5/2008 | |
| KR | 101297362 | | 8/2013 | |
| KR | 10-2014-0100458 | | 8/2014 | |
| KR | 1020140100458 | * | 8/2014 | ............. F25D 11/00 |
| WO | WO 2006/034241 | | 3/2006 | |

OTHER PUBLICATIONS

European Search Report dated Dec. 14, 2017 issued in counterpart application No. 15860889.3-1706, 7 pages.

* cited by examiner

[Figure 1]
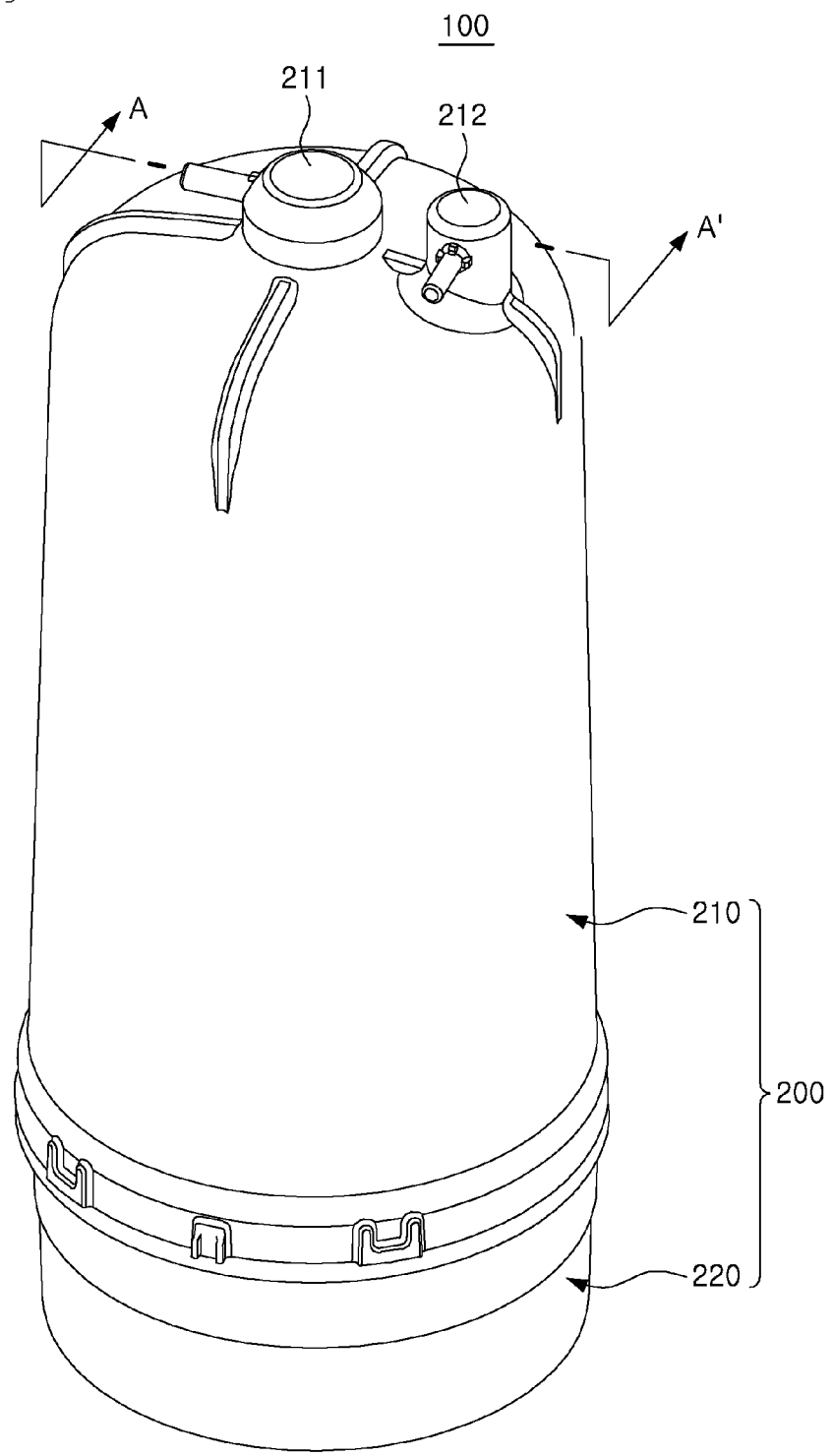

[Figure 2]
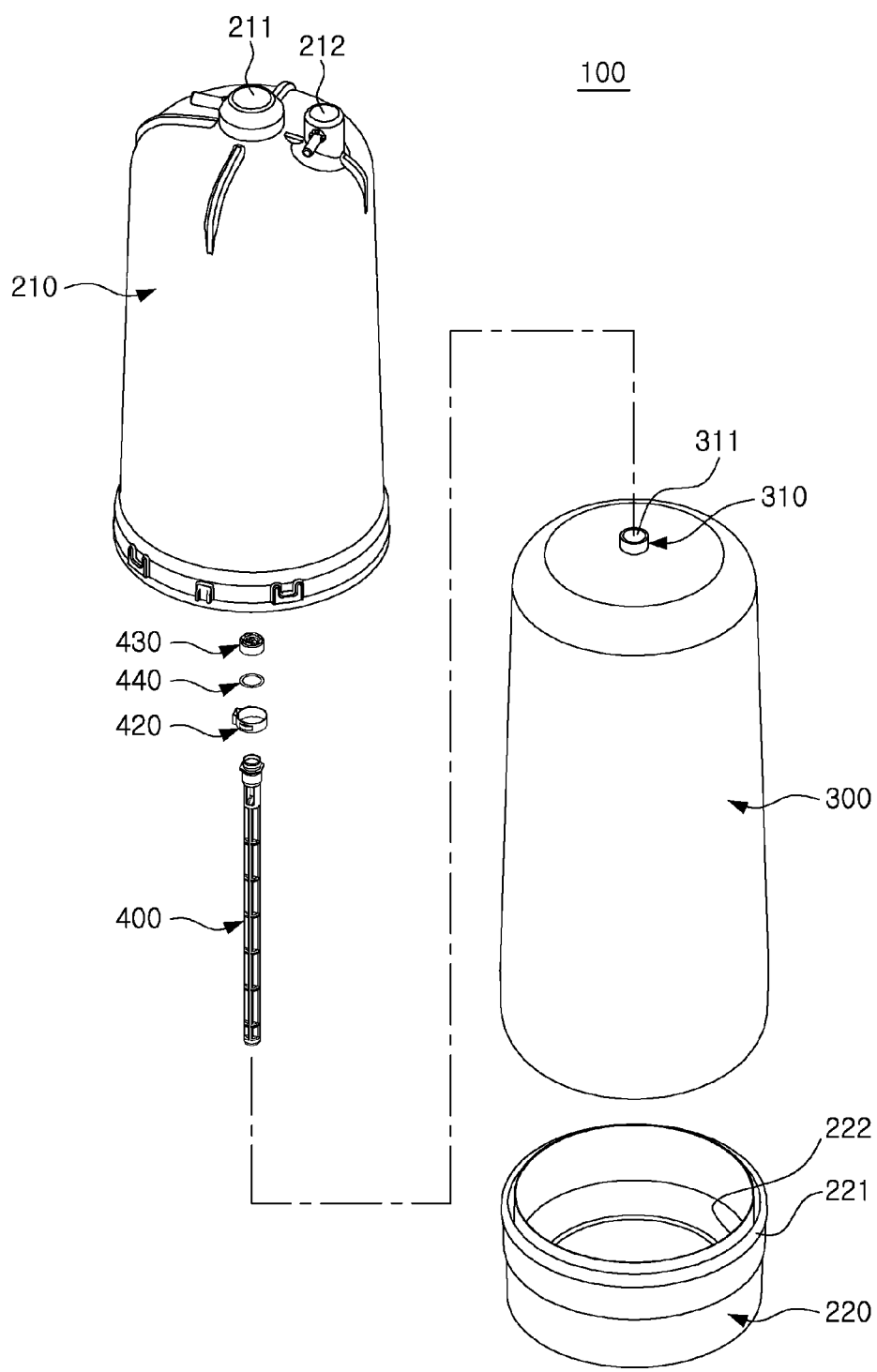

【Figure 3】
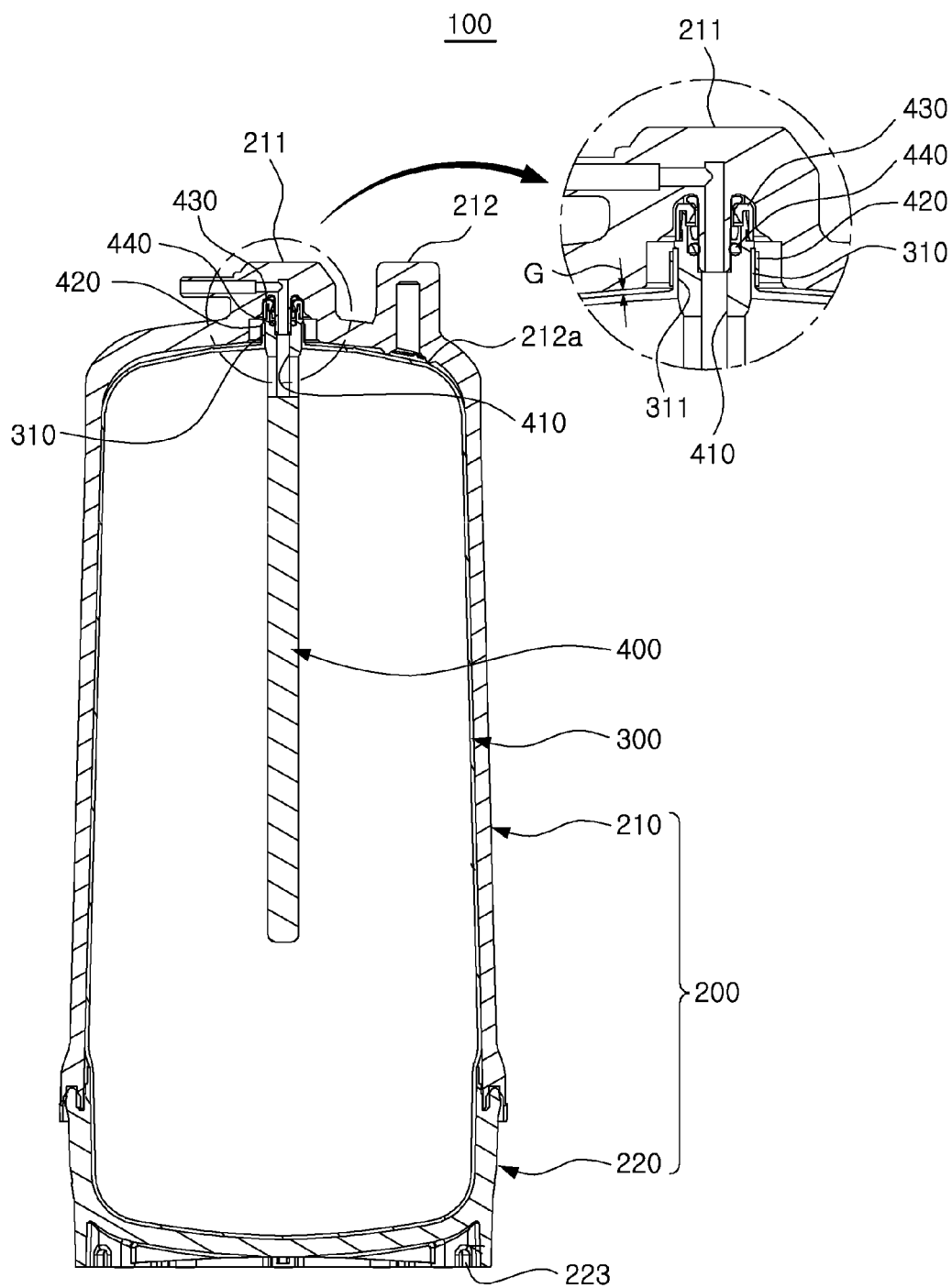

【Figure 4】
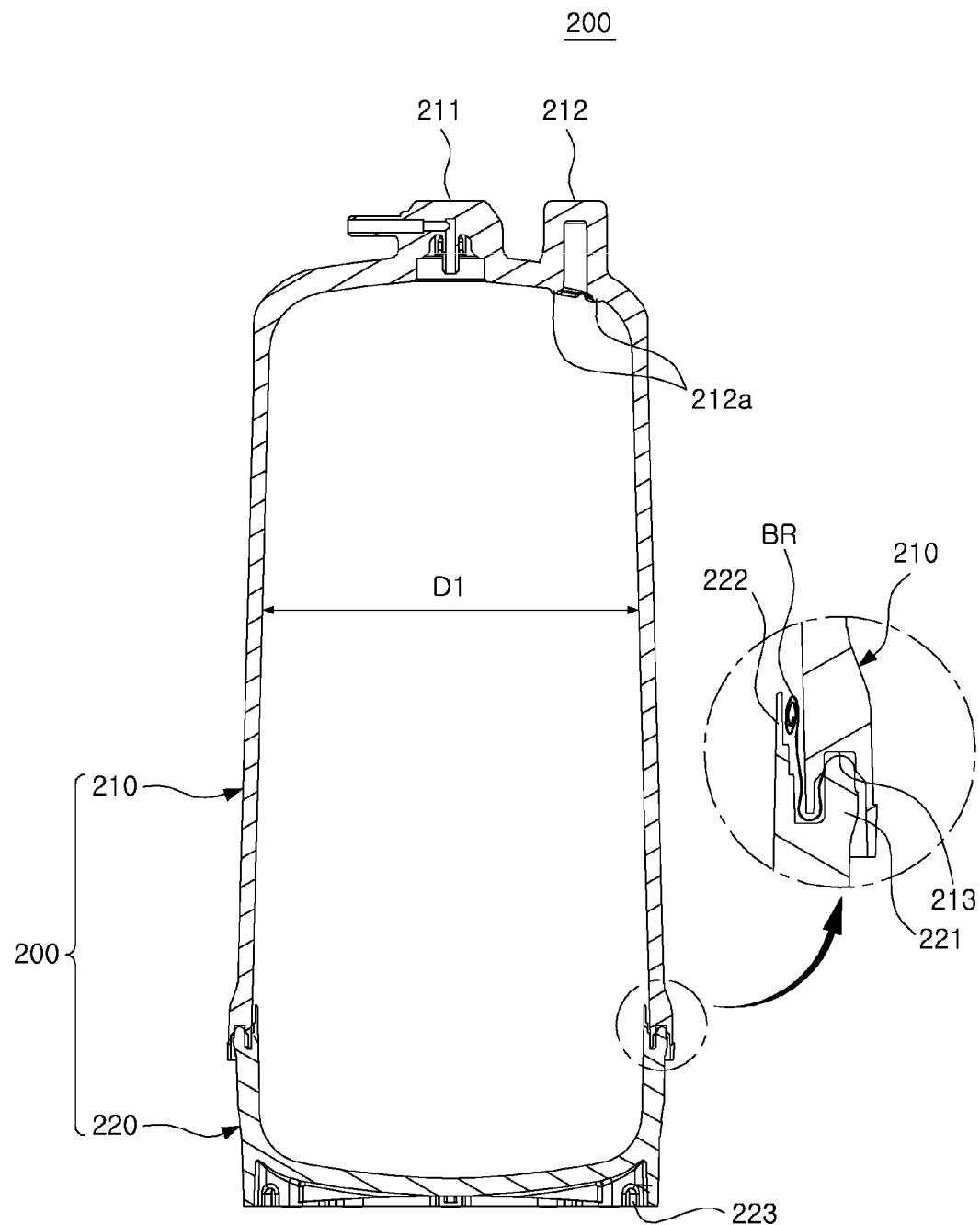

【Figure 5】
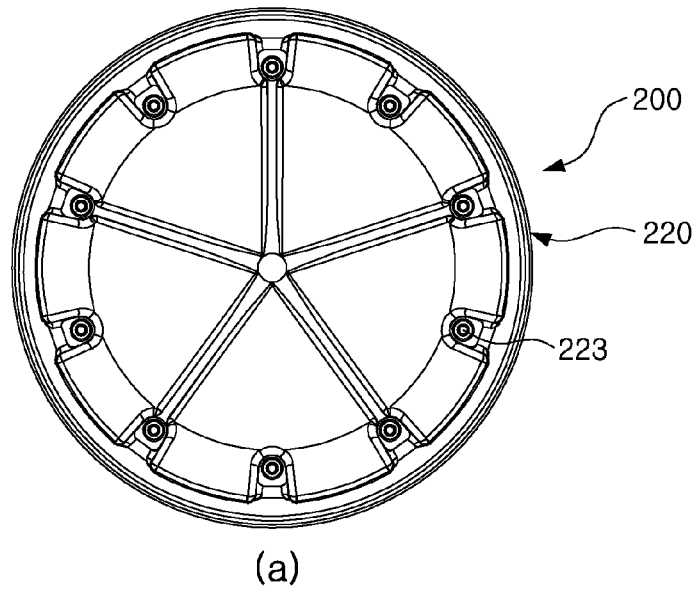
(a)
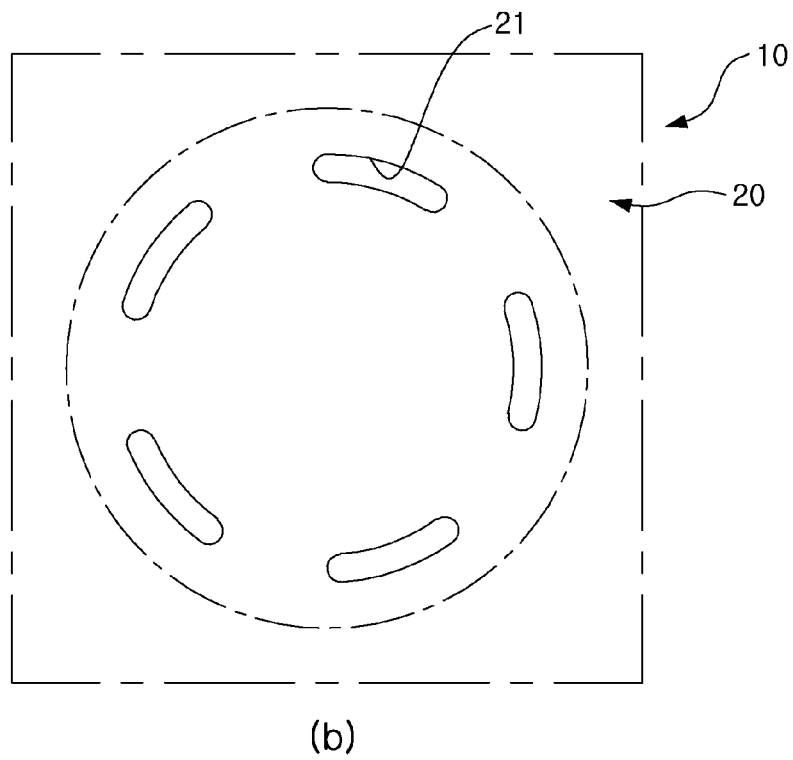
(b)

【Figure 6】
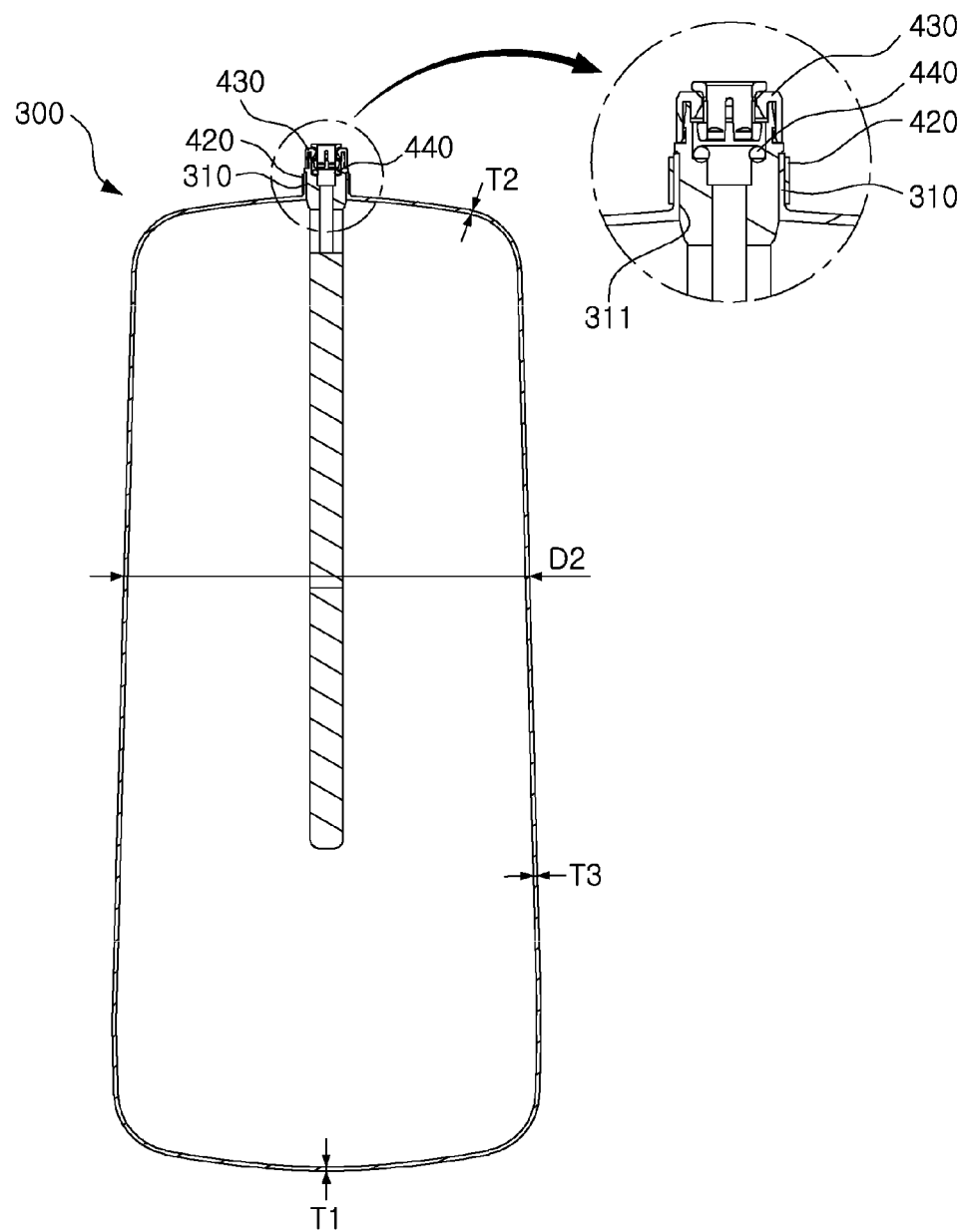

【Figure 7】
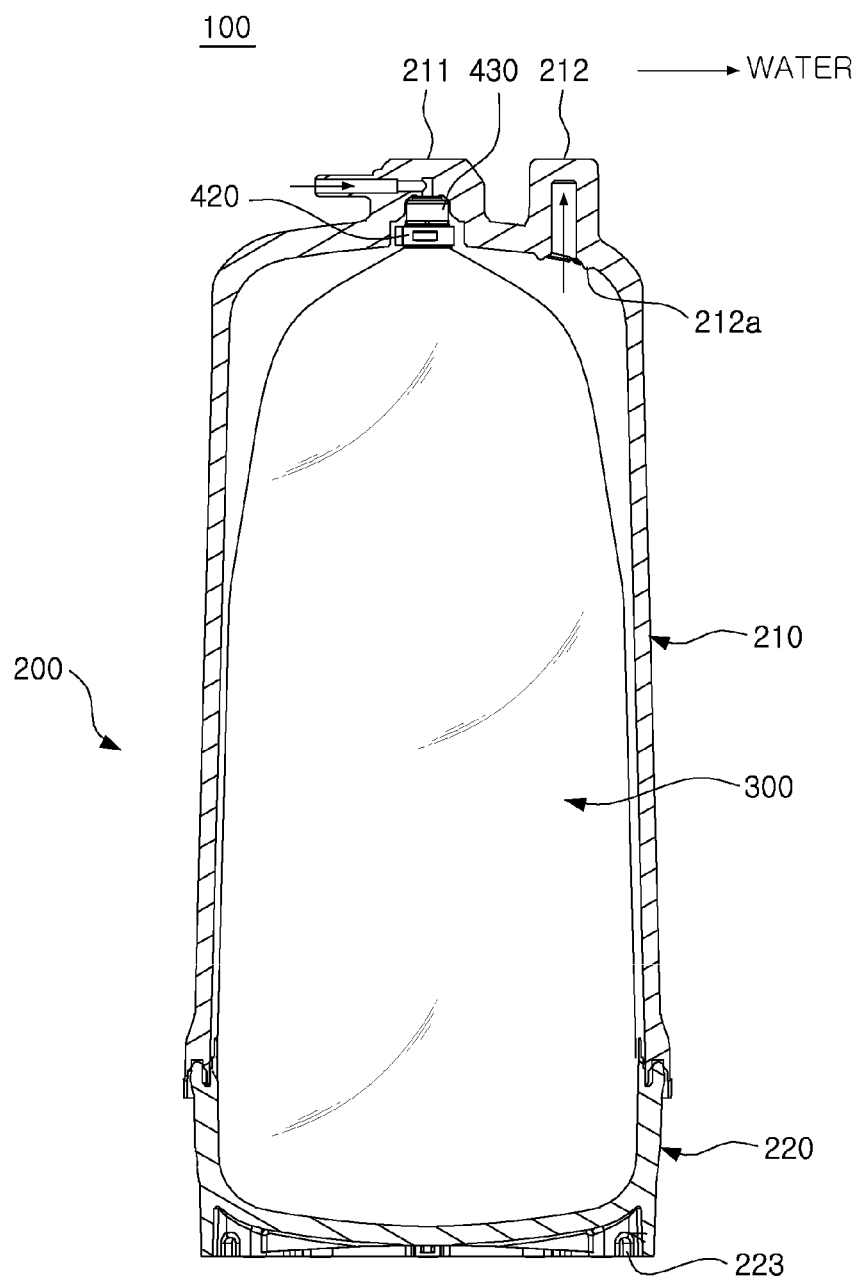

[Figure 8]
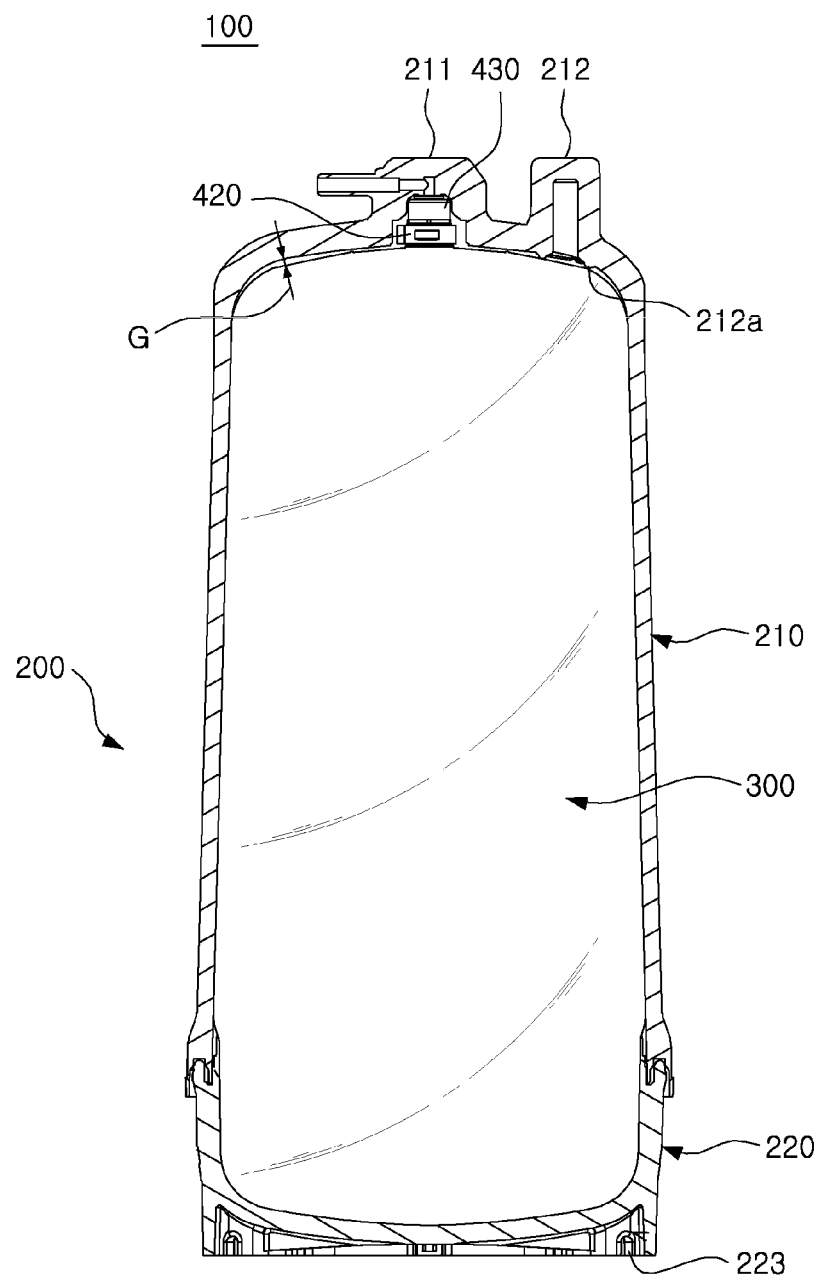

【Figure 9】
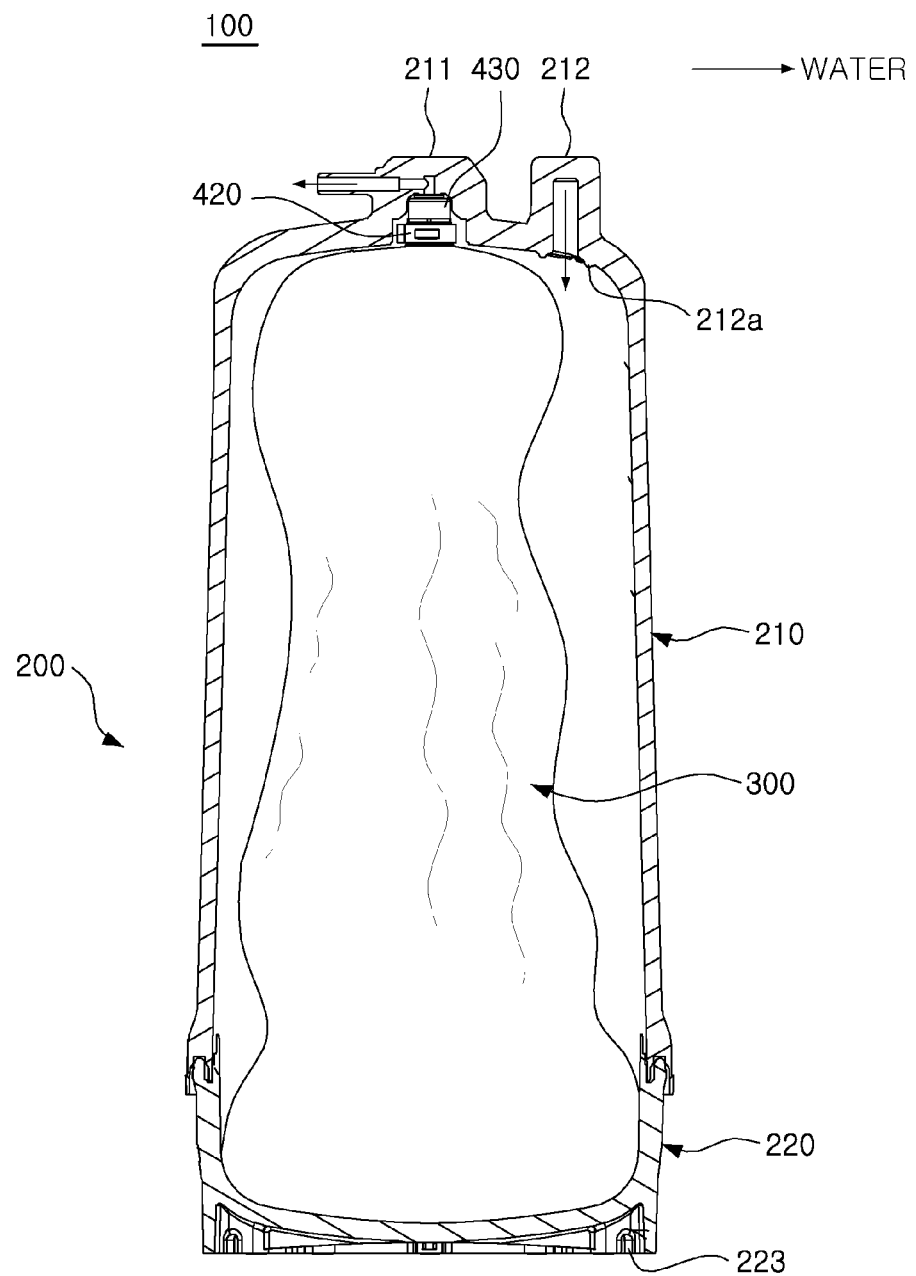

[Figure 10]
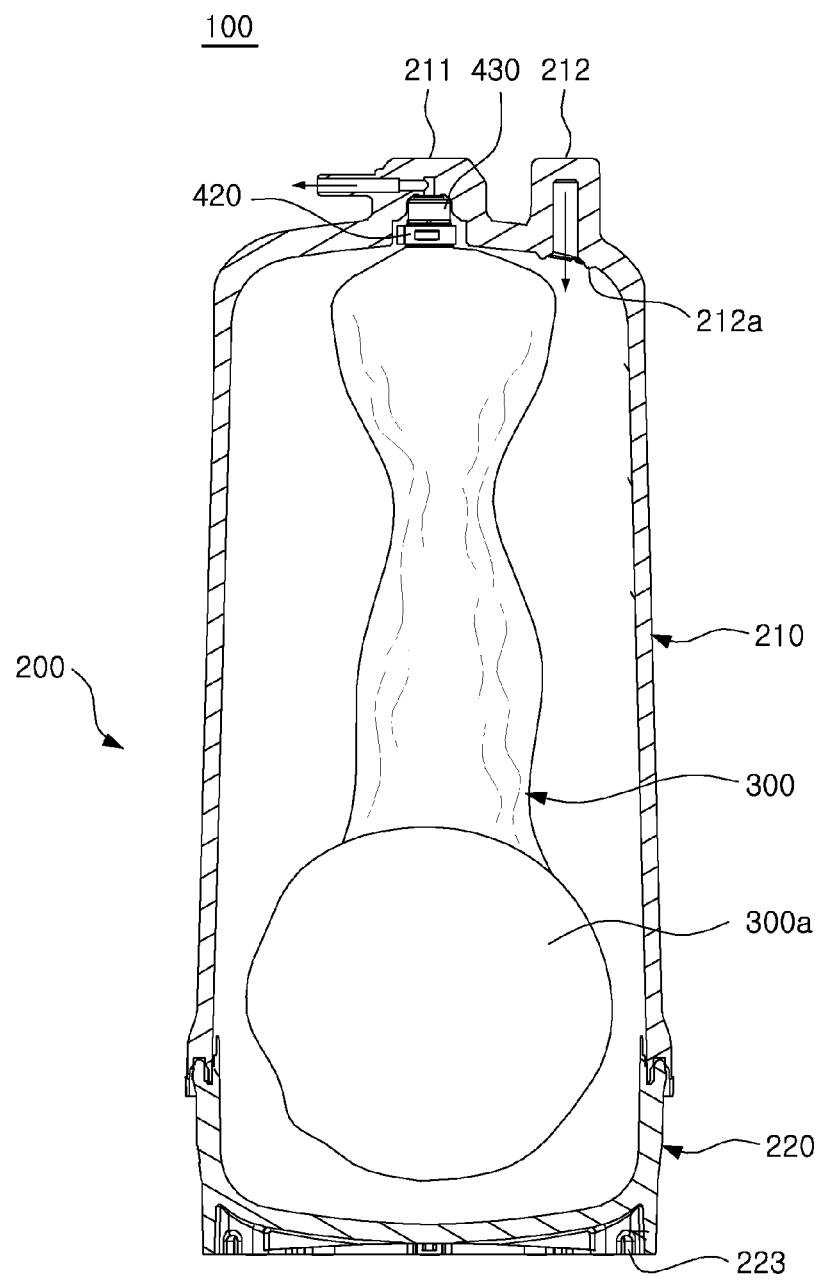

[Figure 11]
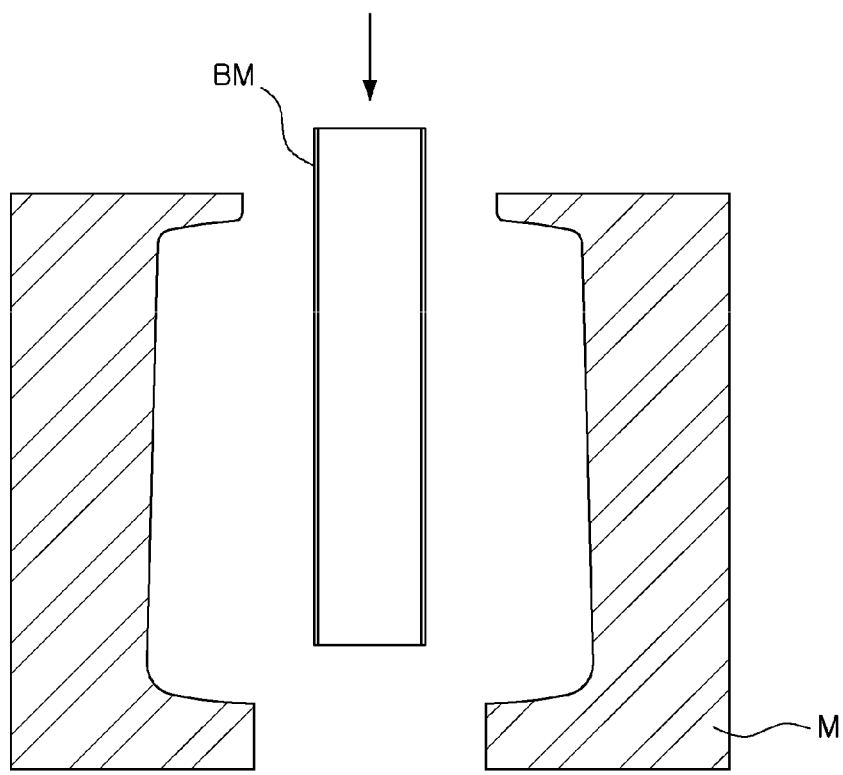
S100

[Figure 12]
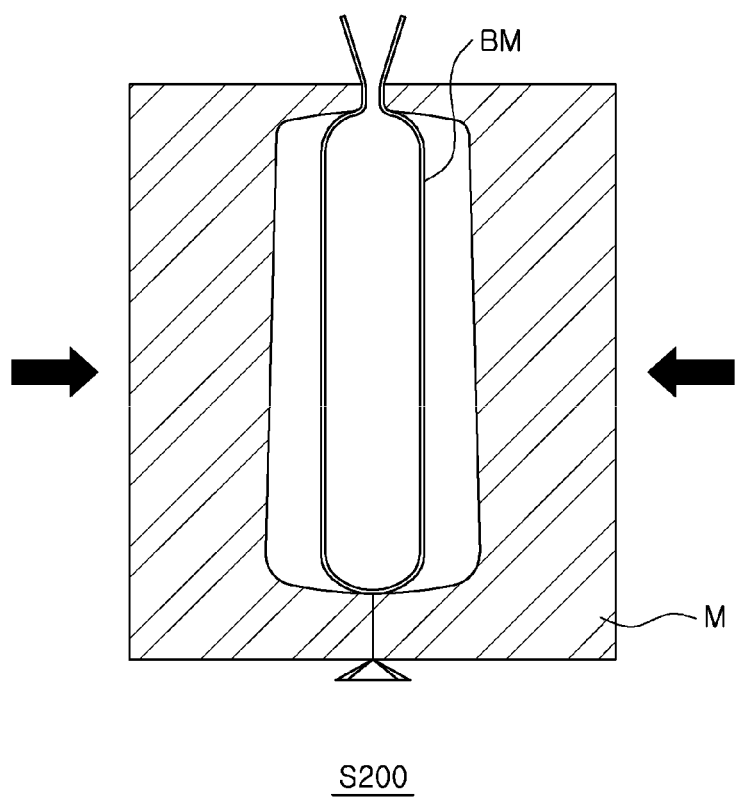
S200

[Figure 13]
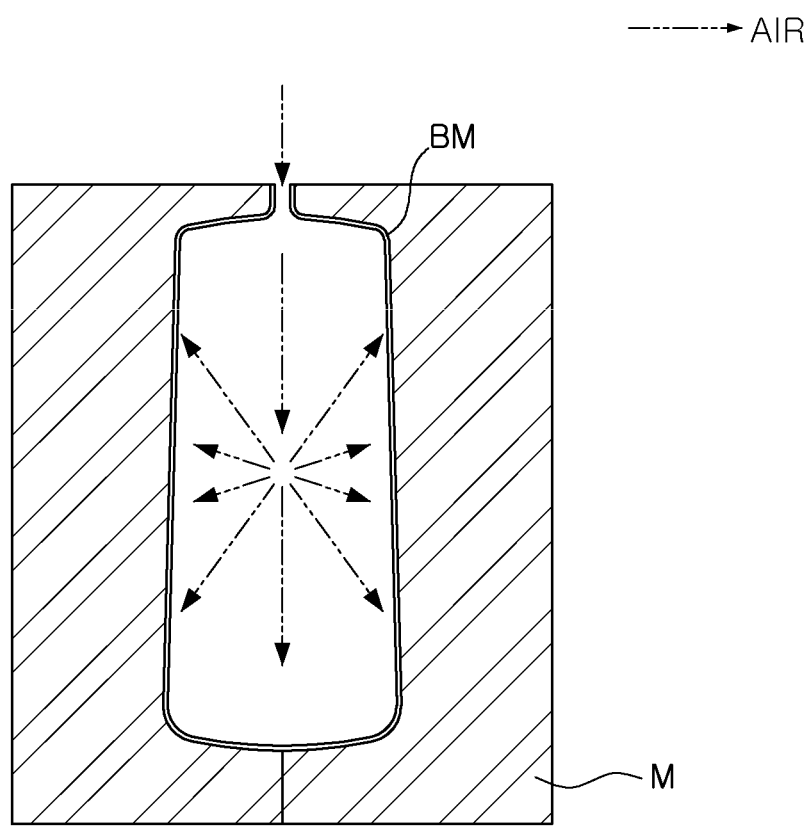
S300

【Figure 14】
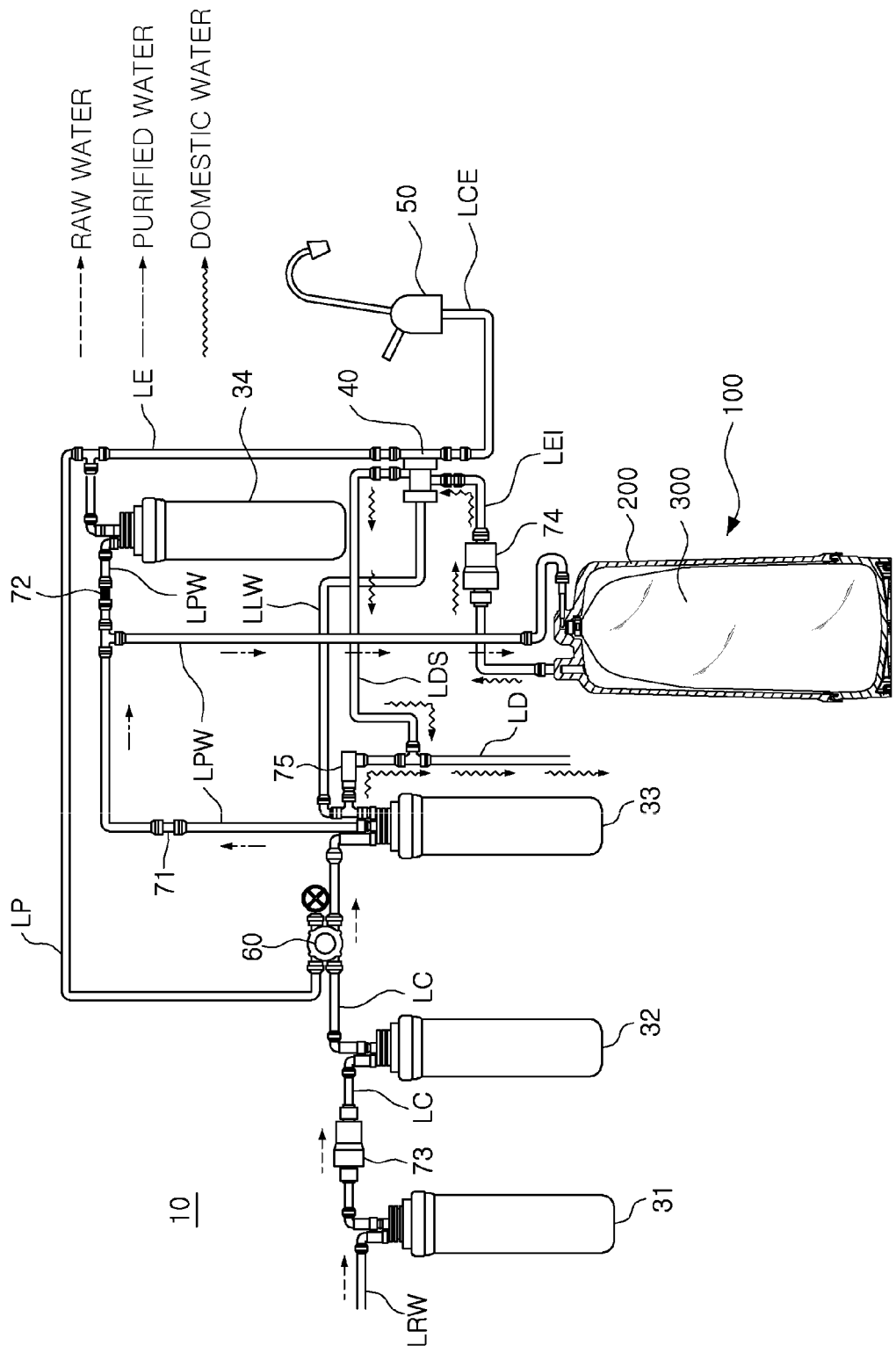

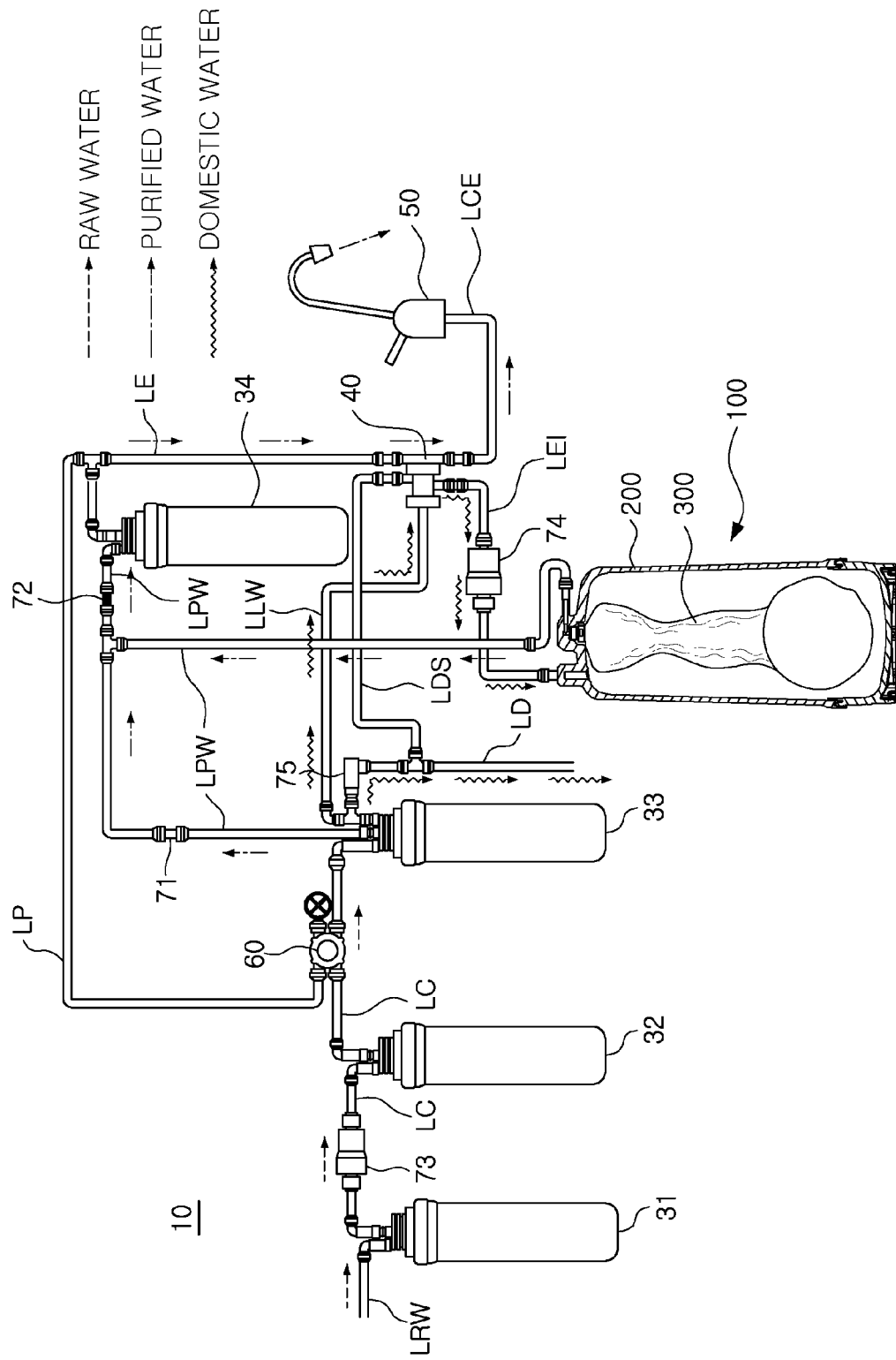
【Figure 15】

WATER STORAGE TANK BLADDER, MANUFACTURING METHOD THEREFOR, WATER STORAGE TANK INCLUDING BLADDER, AND WATER TREATMENT APPARATUS INCLUDING WATER STORAGE TANK

PRIORITY

This application is a National Phase Entry of PCT International Application No. PCT/KR2015/012108, which was filed on Nov. 11, 2015, and claims priority to Korean Patent Application Nos. 10-2014-0162970, 10-2014-0162971, 10-2014-0162972 and 10-2014-0162973, which were each filed on Nov. 20, 2014, the contents of each of which are incorporated herein by reference.

TECHNICAL FIELD

The present disclosure relates to a water storage tank bladder, a method of manufacturing the same, a water storage tank including the same, and a water treatment apparatus including the water storage tank.

BACKGROUND ART

Water storage tanks may be used to store water and to store water having been treated in water treatment apparatuses, such as water purifiers, or the like, and to provide the water to users when required.

In general, in water storage tanks, a storage space for storing water is formed, an inlet connected to a water supply and a storage space and allowing water to flow into and to be stored in a storage space is provided, and an outlet connected to a water discharging member, such as a cock, a faucet, and the like, and allowing the water stored in a storage space to be discharged outwardly is also provided.

The water stored in a storage space in water storage tanks having such a composition is discharged by pressure caused by a difference in height. Thus, there has been a limitation in which an outlet should be disposed in a lower portion of a water storage tank, should be disposed in a water storage tank, in order to be connected to a lower portion of a water storage tank, or should be disposed in a position lower than the surface level of water stored in a storage space.

In addition, there has been a limitation in which a water discharging member should not be disposed in a position higher than a water storage tank.

To remove such limitations, a separate bladder connected to a water supply and a water discharging member are disposed in an interior of a tank body of a water storage tank, so that water in a water supply may be stored in a bladder, and the water stored in a bladder may be discharged outwardly through a water discharge member.

In addition, in order to discharge the water, stored in a bladder, outwardly, water in a water supply connected to a bladder or water in a different water supply has been introduced to a space between an internal side surface of a tank body and a bladder. Furthermore, when water is stored in a bladder, water in a space between an internal side surface of a tank body and a bladder is discharged.

However, in a process in which a capacity of a bladder is changed when water flows into and out of a bladder, durability of a bladder has been degraded.

DISCLOSURE

Technical Problem

The present disclosure is provided by recognizing at least one among demands and problems caused in the related art, as described above.

An aspect of the present disclosure is to provide a water storage tank bladder having improved durability.

Another aspect of the present disclosure is to provide a water storage tank bladder not damaged by repeated folding and unfolding.

Another aspect of the present disclosure is to provide a water storage tank bladder having a reduced number of wrinkles generated therein and a minimized number of intersecting wrinkles generated therein.

Another aspect of the present disclosure is to provide a water storage tank bladder having a lower surface thicker than an upper surface and a side surface.

Another aspect of the present disclosure is to provide a bladder into and out of which water flows, being easily disposed in an interior of a tank body of a water storage tank.

Another aspect of the present disclosure is to provide a bladder including a pole member disposed therein.

Another aspect of the present disclosure is to provide a tank body of a water storage tank, including an upper body and a lower body covering an open lower portion of the upper body.

Another aspect of the present disclosure is to provide a bladder disposed in an interior of a tank body, which is not damaged by a welding burr generated when an upper body and a lower body of a tank body are welded together.

Another aspect of the present disclosure is to provide a burr prevention portion formed in a lower body of a tank body.

Another aspect of the present disclosure is to provide a water storage tank easily connected to a housing of a water treatment apparatus.

Another aspect of the present disclosure is to provide a bladder, which is stable and does not allow back pressure to be applied to a first entrance connected to the bladder so that water may flow thereinto and out thereof and disposed in the tank body, even in the case that the bladder is filled water.

Another aspect of the present disclosure is to provide a bladder in which among surfaces of the bladder, surfaces, except for a surface disposed closest to a second entrance disposed in a tank body to allow water to flow in and out of the tank body, adhere to an internal side surface of the tank body without being expanded therein, in a case in which the bladder is filled with water.

Another aspect of the present disclosure is to provide a bladder having a form corresponding to an internal form of a tank body, and having an external diameter greater than an internal diameter of the tank body.

Another aspect of the present disclosure is to provide a second entrance through which water easily flows into an interior of a tank body.

Technical Solution

A water storage tank bladder, a method of manufacturing the same, a water storage tank including the same, and a water treatment apparatus including the water storage tank, related to an example of undertaking at least one of the tasks described above may include the following characteristics.

According to an aspect of the present disclosure, a water storage tank bladder is used in a water storage tank. Water flows into the water storage tank bladder to be stored therein, and stored water flows out of the water storage tank bladder. A thickness of a lower surface of a bladder may be greater than a thickness of an upper surface and a thickness of a side surface.

In this case, the thickness of the upper surface of the bladder may be greater than that of the side surface thereof.

In addition, the bladder may be cylindrical.

In addition, the bladder may be formed using a polyolefin elastomer.

Furthermore, the bladder may be manufactured using blow molding.

According to an aspect of the present disclosure, a method of manufacturing a water storage tank bladder may include mounting a material to mount a bladder material in a mold; fixing a material to fix the bladder material to the mold; and molding a bladder to mold the bladder by injecting air into the bladder material.

In this case, the bladder material may have at least one open side and may be cylindrical.

In addition, in the fixing a material, an opposite side of the bladder material to a side, on which air is injected in the molding a bladder, may be fixed to the mold.

In addition, in the molding a bladder, hot air may be injected into the bladder material.

Furthermore, the bladder material may be formed using a polyolefin elastomer.

According to an aspect of the present disclosure, a water storage tank may include a tank body including a first entrance and a second entrance into and out of which water flows; and a bladder, described above, disposed in an interior of the tank body to be connected to the first entrance and into or out of which water flows through the first entrance, while water flows out of or into the interior of the tank body through the second entrance.

In this case, the bladder may include a pole member disposed therein.

In addition, the bladder may include a connection portion connected to the first entrance, while an end portion of the pole member may be connected to the connection portion.

In addition, the end portion of the pole member may be inserted into a connection hole formed in the connection portion and may be connected to the connection portion in such a manner that a circumference of the connection portion is clamped by a clamping member.

The connection portion may be formed above the bladder, while the pole member may be extended from the connection portion below a central portion of the bladder.

The pole member may be sealed at and connected to the first entrance by a fitting member.

In the pole member, a communication hole in communication with the first entrance and an interior of the bladder may be formed.

The tank body may comprise an upper body including the first entrance and the second entrance, as well as a lower body connected to the upper body to cover an open lower portion of the upper body.

A welding groove may be formed in a lower end portion of the upper body, while a welding protrusion inserted into the welding groove may be formed in an upper end portion of the lower body.

In the upper end portion of the lower body, a welding burr generated during welding may be formed not to be exposed in the interior of the tank body.

A burr prevention portion may be formed on an internal side of the welding protrusion, while a portion of the lower end portion of the upper body may be inserted between the burr prevention portion and the welding protrusion.

The burr prevention portion may be extended in an upward direction to be higher than the welding protrusion.

A surface of the burr prevention portion facing the lower end portion of the upper body may be provided as a stepped surface.

The stepped surface may be formed to have a space between the stepped surface and the lower end portion of the upper body, widening in an upward direction.

In the lower body, a plurality of first connection holes may be disposed with a predetermined angle between respective holes among the plurality of first connection holes.

The bladder may be formed to be stable and not to allow back pressure to be applied to the first entrance, even in the case that the bladder is filled with water.

The bladder may have a form corresponding to an internal form of the tank body.

In a case in which the bladder is filled with water, surfaces, except for a surface disposed closest to the second entrance, may adhere to an internal side surface of the tank body without being expanded therein.

An external diameter of the bladder may be greater than an internal diameter of the tank body.

The external diameter of the bladder may be greater, by 0 mm to 1.2 mm, than the internal diameter of the tank body.

The surface of the bladder, disposed closest to the second entrance, may be disposed to be spaced apart from an internal side surface of the tank body by a predetermined interval.

The predetermined interval may be 0.5 mm to 1.5 mm.

The surface of the bladder, disposed closest to the second entrance, may be provided as an upper surface of the bladder.

An interval protrusion may be formed in a portion of the interior of the tank body in a vicinity of the second entrance.

According to an aspect of the present disclosure, a water treatment apparatus may include a water storage tank, described above; and a housing combined with the water storage tank.

In this case, in a lower body included in a tank body of the water storage tank, a plurality of first connection holes may be disposed with a predetermined angle between respective holes among the plurality of first connection holes.

In the housing, a plurality of second connection holes having an arc form corresponding to a first connection hole may be disposed with a predetermined angle between respective holes among the plurality of second connection holes.

The number of second connection holes may be half that of first connection holes.

A central angle of the second connection holes may be equal to 1 to 1.5 times an angle formed by the first connection holes.

Advantageous Effects

According to an aspect of the present disclosure, a lower surface of a water storage tank bladder may be thicker than an upper surface and a side surface.

According to an aspect of the present disclosure, the number of wrinkles generated in a water storage tank bladder may be reduced, and the number of intersecting wrinkles generated in a bladder may be minimized.

According to an aspect of the present disclosure, a water storage tank bladder may not be damaged by repeated folding and unfolding.

According to an aspect of the present disclosure, a water storage tank bladder may have improved durability.

According to an aspect of the present disclosure, a pole member may be disposed in an interior of a bladder into and out of which water flows.

According to an aspect of the present disclosure, a bladder may be easily disposed in an interior of a tank body of a water storage tank.

According to an aspect of the present disclosure, a tank body of a water storage tank may include an upper body and a lower body covering an open lower portion of the upper body.

According to an aspect of the present disclosure, a burr prevention portion may be formed in a lower body of a tank body.

According to an aspect of the present disclosure, a bladder disposed in an interior of a tank body may not be damaged by a welding burr occurring when an upper body and a lower body of a tank body are welded together.

According to an aspect of the present disclosure, ease of the connection of a water storage tank to a housing of a water treatment apparatus may be facilitated.

According to an aspect of the present disclosure, a bladder disposed in a tank body of a water storage tank has a form corresponding to an internal form of the tank body, and an external diameter of the bladder may be greater than an internal diameter of the tank body.

According to an aspect of the present disclosure, among surfaces of a bladder, surfaces, except for a surface disposed closest to a second entrance disposed in a tank body to allow water to flow in and out of the tank body, may adhere to an internal side surface of the tank body without being expanded therein, in a case in which the bladder is filled with water.

According to an aspect of the present disclosure, a bladder may be stable, and back pressure may not be applied to a first entrance connected to the bladder to allow water to flow in and out of the first entrance and disposed in a tank body, even in the case that the bladder is filled with water.

According to an aspect of the present disclosure, water may easily flow into an interior of a tank body through a second entrance.

DESCRIPTION OF DRAWINGS

FIG. 1 is a perspective view of a water storage tank according to an example.

FIG. 2 is an exploded perspective view of a water storage tank according to an example.

FIG. 3 is a cross-sectional view taken along line A-A' of FIG. 1.

FIG. 4 is a cross-sectional view of only a tank body of FIG. 3.

FIG. 5 is a bottom view of the tank body of a water storage tank and a portion of a water treatment apparatus with which the tank body is combined, according to an example.

FIG. 6 is a cross-sectional view of only a bladder of FIG. 3.

FIGS. 7 to 10 are partially cutaway views illustrating operations of a water storage tank according to an example.

FIGS. 11 to 13 are schematic diagrams illustrating a method of manufacturing a bladder of a water storage tank according to an example.

FIGS. 14 and 15 are piping diagrams of a water treatment apparatus using a water storage tank and operations thereof according to an example.

MODE FOR INVENTION

For the sake of gaining a better understanding of the characteristics of the present disclosure described above, a water storage tank bladder, a method of manufacturing the same, a water storage tank including the same, and a water treatment apparatus including the water storage tank, related to an example, will be described in more detail, hereinafter.

Hereinafter, examples of the present disclosure will be described in detail with reference to the accompanying drawings. The disclosure may, however, be exemplified in many different forms and should not be construed as being limited to the specific embodiments set forth herein, and those skilled in the art and understanding the present disclosure could easily accomplish retrogressive inventions or other embodiments included in the scope of the present disclosure by the addition, modification, and removal of components within the same scope, but those are to be construed as being included in the scope of the present disclosure. Like reference numerals will be used to designate like components having similar functions throughout the drawings within the scope of the present disclosure.

[Water Storage Tank]

Hereinafter, a water storage tank according to an example will be described with reference to FIGS. 1 to 13.

FIG. 1 is a perspective view of a water storage tank according to an example, while FIG. 2 is an exploded perspective view of a water storage tank according to an example.

FIG. 3 is a cross-sectional view taken along line A-A' of FIG. 1; FIG. 4 is a cross-sectional view of only a tank body of FIG. 3; FIG. 5 is a bottom view of the tank body of a water storage tank and a portion of a water treatment apparatus with which the tank body is combined, according to an example; and FIG. 6 is a cross-sectional view of only a bladder of FIG. 3.

FIGS. 7 to 10 are partially cutaway views illustrating operations of the water storage tank according to an example, while FIGS. 11 to 13 are schematic diagrams illustrating a method of manufacturing a bladder of a water storage tank according to an example.

A water storage tank 100 according to an example may include a tank body 200 and a bladder 300.

Tank Body

The tank body 200 may include a first entrance 211 and a second entrance 212. As illustrated in FIGS. 7 to 10, water may flow in and out through the first entrance 211 and the second entrance 212.

The first entrance 211 may be connected to the bladder 300. Thus, water may be introduced to the bladder 300 through the first entrance 211 and stored therein or the water stored in the bladder 300 may flow out through the first entrance 211.

In addition, water may flow into an interior of the tank body 200 through the second entrance 212, or the water in the interior of the tank body 200 may flow out through the second entrance 212.

As illustrated in FIG. 7, the water in the interior of the tank body 200 may flow out through the second entrance 212, and water may flow into the bladder 300 through the first entrance 211. As illustrated in FIGS. 9 and 10, water may flow into the interior of the tank body 200 through the second entrance 212, and water stored in the bladder 300 may flow out through the first entrance 211.

The tank body 200 may be roughly cylindrical, as illustrated in FIG. 1. However, a form of the tank body 200 is not specifically limited, and the tank body 200 may have any form.

As illustrated in FIGS. 2 to 4, the tank body 200 may include an upper body 210 and a lower body 220.

The upper body 210 may include the first entrance 211 and the second entrance 212, described above. The first entrance 211 and the second entrance 212 may be disposed on an upper surface of the upper body 210.

However, a position in which the first entrance 211 or the second entrance 212 is disposed is not specifically limited. The first entrance 211 or the second entrance 212 may be disposed in the upper body 210 in any position. In addition, the first entrance 211 or the second entrance 212 may be disposed in the lower body 220.

A welding groove 213 may be formed in a lower end portion of the upper body 210, as illustrated in FIG. 4. A welding protrusion 221 of the lower body 220, which will be subsequently described, may be inserted into the welding groove 213 of the upper body 210, as illustrated therein. In detail, the welding groove 213 of the upper body 210 may be welded to the welding protrusion 221 of the lower body 220 using rotational welding, or the like, so that the welding groove 213 may be connected to the welding protrusion 221.

The lower body 220 may be connected to the upper body 210 to cover an open lower portion of the upper body 210. The lower body 220 may be connected to the upper body 210 using welding, such as rotational welding, or the like, as described above. To this end, the welding protrusion 221 inserted into the welding groove 213 of the upper body 210 may be formed in an upper end portion of the lower body 220.

In addition, as illustrated in FIGS. 2 and 4, a burr prevention portion 222 may be formed in the upper end portion of the lower body 220. Due to the burr prevention portion 222, a welding burr BR generated during welding may not be exposed in the interior of the tank body 200.

In other words, even in the case that the welding burr BR is generated in a portion in which the welding groove 213 of the upper body 210 and the welding protrusion 221 of the lower body 220 are welded together, the welding burr BR, which is generated, may not go over the burr prevention portion 222.

Thus, the bladder 300 may not be damaged by the welding burr BR having a sharp edge.

To this end, the burr prevention portion 222 may be formed on an internal side of the welding protrusion 221, as illustrated in FIGS. 2 and 4. Furthermore, a portion of the lower end portion of the upper body 210, that is, an internal side portion among portions forming the welding groove 213, may be inserted between the burr prevention portion 222 and the welding protrusion 221.

Thus, the burr prevention portion 222 may surround an internal side of the lower end portion of the upper body 210.

The burr prevention portion 222 may be extended in an upward direction to be higher than the welding protrusion 221. A surface of the burr prevention portion 222, facing the lower end portion of the upper body 210, may be provided as a stepped surface. The stepped surface may be formed in such a manner that a space between the lower end portion of the upper body 210 and the stepped surface widens in an upward direction.

Thus, even in the case that the welding burr BR is generated and grown, the welding burr BR may be rolled up in the space between the stepped surface of the burr prevention portion 222 and the lower end portion of the upper body 210. Thus, the welding burr BR may not go over the burr prevention portion 222 to be exposed in the interior of the tank body 200.

In the lower body 220, a plurality of first connection holes 223 may be disposed with a predetermined angle between respective holes among the plurality of first connection holes 223, as illustrated in FIG. 5A. For example, ten first connection holes 223 may be disposed with an angle of 36° therebetween, as illustrated therein.

However, the number of the first connection holes 223 formed in the lower body 220 or an angle formed thereby is not specifically limited, and any number of holes or angle therebetween is possible.

In a case in which a water storage tank 100 according to an example is used in a water treatment apparatus 10, such as a water purifier, or the like, a plurality of second connection holes 21 having an arc form corresponding to a first connection hole 223 may be disposed with a predetermined angle between respective holes among the plurality of second connection holes 21 in a housing 20 of the water treatment apparatus 10, as illustrated in FIG. 5B.

Thus, the water storage tank 100 according to an example may be stably combined with the housing 20 of the water treatment apparatus 10 in such a manner that a bolt, or the like, penetrates through the second connection hole 21 of the housing 20 to be coupled to the first connection hole 223 of the lower body 220.

In this case, the number of second connection holes 21 may be half that of first connection holes 223. A central angle of the second connection hole 21 having an arc form may be equal to 1 to 1.5 times an angle formed by the first connection holes 223.

Thus, in a case in which the water storage tank 100 according to an example is disposed in the housing 20 of the water treatment apparatus 10 including the second connection hole 21 formed therein, the second connection hole 21 having an arc form may be in communication with at least one first connection hole 223.

Thus, time spent in adjusting a position of the water storage tank 100, in order for the first connection hole 223 of the water storage tank 100 to be in communication with the second connection hole 21 of the housing 20 of the water treatment apparatus 10, may be saved.

Thus, an example of the water storage tank 100 according to an example may be easily combined with the housing 20 of the water treatment apparatus 10.

In the meantime, in a case in which the central angle of the second connection hole 21, having an arc form, is less than the angle formed by the first connection holes 223, at least one second connection hole 21 may not be in communication with the first connection hole 223.

In addition, in a case in which the central angle of the second connection hole 21 having an arc form is greater than 1.5 times the angle formed by the first connection holes 223, two second connection holes 21 may be in communication with the first connection hole 223, or the second connection holes 21 may be connected to each other.

Thus, the central angle of the second connection hole 21 having an arc form, which can be in communication with at least one first connection hole 223, may be equal to 1 to 1.5 times the angle formed by the first connection holes 223.

Bladder

A bladder 300 may be disposed in an interior of a tank body 200. In addition, the bladder 300 may be connected to a first entrance 211 of the tank body 200.

In the case of the bladder 300, water in the interior of the tank body 200 may flow out through a second entrance 212 of the tank body 200, and water may flow into the bladder 300 through the first entrance 211 to be stored therein, as described above and illustrated in FIG. 7.

In addition, water may flow into the interior of the tank body 200 through the second entrance 212 of the tank body 200, and water stored in the bladder 300 may flow out through the first entrance 211, as described above and illustrated in FIGS. 9 and 10.

The bladder 300 may be stable, and back pressure may not be applied to the first entrance 211, even in the case that the bladder is filled with water.

The bladder 300 may have a form corresponding to an internal form of the tank body 200. For example, in an example of the water storage tank 100 according to an example, the internal form of the tank body 200 may be roughly cylindrical, as illustrated in FIG. 2. Thus, the form of the bladder 300 may also be roughly cylindrical, corresponding to the internal form of the tank body 200.

However, the form of the bladder 300 is not specifically limited. The bladder 300 may have any form corresponding to the internal form of the tank body 200.

In the meantime, as illustrated in FIG. 8, in a case in which the bladder 300 is filled with water, among surfaces of the bladder 300, surfaces, except for a surface disposed closest to the second entrance 212 of the tank body 200, may adhere to an internal side surface of the tank body 200 without being expanded therein.

To this end, an external diameter D2 of the bladder 300 may be greater than or equal to an internal diameter D1 of the tank body 200. Thus, as illustrated in FIG. 8, in a case in which the bladder 300 is filled with water, among surfaces of the bladder 300, surfaces, except for the surface disposed closest to the second entrance 212 of the tank body 200, may adhere to the internal side surface of the tank body 200 without being expanded therein.

The external diameter D2 of the bladder 300 may be greater, by 0 mm to 1.2 mm, than the internal diameter D1 of the tank body 200.

In a case in which the external diameter D2 of the bladder 300 is less than the internal diameter D1 of the tank body 200, when the bladder 300 is filled with water, the bladder 300 may be expanded to be damaged.

Furthermore, in a case in which the external diameter D2 of the bladder 300 is greater, by more than 1.2 mm, than the internal diameter D1 of the tank body 200, ease of the insertion of the bladder 300 into the interior of the tank body 200 may not be facilitated. In addition, a process in which the bladder 300 is filled with water may be interrupted by the tank body 200.

Due to the composition described above, as illustrated in FIG. 8, even in the case that the bladder 300 is filled with water, pressure in the interior of the bladder 300 may not be increased to a level higher than a supply pressure of water supplied to the bladder 300 through the first entrance 211 of the tank body 200.

Thus, since the bladder 300 is not damaged by internal pressure, the bladder 300 is stable, and back pressure may not be applied to the first entrance 211 of the tank body 200 connected to the bladder 300.

The surface of the bladder 300, disposed closest to the second entrance 212, may be disposed to be spaced apart from an internal side surface of the tank body 200 by a predetermined gap G. Thus, even in the case that the bladder 300 is filled with water, water may easily flow into the interior of the tank body 200 through the second entrance 212 of the tank body 200. Thus, the water stored in the bladder 300 may easily flow out through the first entrance 211 of the tank body 200.

The gap G between the surface of the bladder 300, disposed closest to the second entrance 212, and the internal side surface of the tank body 200 may be 0.5 mm to 1.5 mm.

In a case in which the gap G between the surface of the bladder 300, disposed closest to the second entrance 212, and the internal side surface of the tank body 200 may be less than 0.5 mm, when water flows into the interior of the tank body 200 through the second entrance 212 with the bladder 300 filled with water, water flowing thereinto may not provide sufficient pressure to contract the bladder 300. Thus, it may be difficult for water in the bladder 300 to flow out thereof.

In a case in which the gap G between the surface of the bladder 300, disposed closest to the second entrance 212, and the internal side surface of the tank body 200 may be greater than 1.5 mm, when the bladder 300 is filled with water, as illustrated in FIG. 8, the bladder 300 is expanded toward the gap G, so that the internal pressure of the bladder 300 may be increased to be higher than the supply pressure of water supplied to the bladder 300 through the first entrance 211 of the tank body 200.

Thus, the gap G between the surface of the bladder 300, disposed closest to the second entrance 212, and the internal side surface of the tank body 200 may be 0.5 mm to 1.5 mm to prevent the bladder 300 from being expanded while water easily flows into the interior of the tank body 200 through the second entrance 212 of the tank body 200 when the bladder 300 is filled with water, as illustrated in FIG. 8.

In the water storage tank 100 according to an example, the second entrance 212 may be disposed on an upper surface of an upper body 210 of the tank body 200. Thus, the surface of the bladder 300, disposed closest to the second entrance 212, may be provided as an upper surface of the bladder 300.

However, the surface of the bladder 300, disposed closest to the second entrance 212, is not limited to the upper surface of the bladder 300, but may be provided as any surface, such as a side surface, a lower surface, or the like, of the bladder 300 according to a position in which the second entrance 212 is disposed.

In addition, in a portion of the interior of the tank body 200 in a vicinity of the second entrance 212, an interval protrusion 212a may be formed, as illustrated in FIG. 4. Thus, a gap may be formed between the bladder 300 and the portion of the interior of the tank body 200 in a vicinity of the second entrance 212. In addition, even in the case that the bladder 300 is filled with water, water may easily flow into the interior of the tank body 200 through the second entrance 212.

In the meantime, a pole member 400 may be disposed in the bladder 300, as illustrated in FIGS. 3 and 6. As such, in a case in which the pole member 400 is disposed in the bladder 300, the bladder 300 may be easily disposed in the interior of the tank body 200.

In other words, in a case in which a user grasps the bladder 300, the user can grasp the pole member 400 together therewith. Thus, the user may more easily grasp the bladder 300.

Thus, while a lower body 220 of the tank body 200 is separated from the upper body 210, the bladder 300 may be easily inserted into an interior of the upper body 210 through an open lower portion of the upper body 210. In addition, while the bladder 300 is disposed in the interior of the upper body 210, the bladder 300 may be easily connected to the upper body 210.

In addition, in a case in which the water stored in the bladder 300 flows out through the first entrance 211 of the tank body 200, as illustrated in FIGS. 9 and 10, an interior of the bladder 300 becomes a vacuum, and a volume of the interior thereof is reduced, so that the bladder 300 may be folded.

In this case, the bladder 300 may be folded based on the pole member 400. Thus, the bladder 300 may be folded to have a relatively uniform pattern. When the bladder 300 is folded, the wrinkles generated in the bladder 300 may also have a relatively uniform pattern. For example, wrinkles in a vertical direction may be formed in parallel on a side surface of the bladder 300.

In addition, the lower surface of the bladder 300 is relatively thick. Thus, in a case in which a certain amount of water of the bladder 300 flows out thereof, as illustrated in FIG. 10, a lower surface 300a of the bladder 300 may maintain a form thereof, and a wrinkle having a uniform pattern may be formed in the bladder 300.

Thus, when the volume of the interior of the bladder 300 is reduced, the number of intersecting wrinkles generated in the bladder 300 may be minimized. In detail, the intersecting wrinkles may not be substantially generated on the side surface of the bladder 300.

Durability of a portion of the bladder 300 in which wrinkles intersect is weaker than other portions of the bladder 300. In addition, when the bladder 300 is repeatedly folded and unfolded due to water flowing into and out of the bladder 300, an intersection portion of the wrinkles generated in the bladder 300 may first be damaged, so that the bladder 300 may be easily damaged.

However, in a case in which the pole member 400 is disposed in the bladder 300, the number of intersecting wrinkles generated in the bladder 300 is minimized, and the intersecting wrinkles may not substantially be generated on the side surface of the bladder 300, as described above. Thus, in this case, even in the case that the bladder 300 is repeatedly folded and unfolded, the bladder 300 may not be easily damaged. In addition, durability of the bladder 300 may be improved.

As illustrated in FIGS. 2 and 6, a connection portion 310 connected to the first entrance 211 of the tank body 200 may be formed in the bladder 300. As illustrated in FIG. 3, an end portion of the pole member 400 may be connected to a connection portion 310 of the bladder 300.

To this end, the end portion of the pole member 400 may be inserted into a connection hole 311 formed in the connection portion 310, and a circumference of the connection portion 310 may be clamped by a clamping member 420. Thus, while the end portion of the pole member 400 is connected to the connection portion 310, a space between the end portion of the pole member 400 and the connection hole 311 may be sealed by the connection portion 310.

A configuration of the clamping member 420 is not specifically limited, and the clamping member 420 may have any configuration allowing the circumference of the connection portion 310 to be clamped, while the end portion of the pole member 400 is inserted into the connection hole 311 of the connection portion 310.

The connection portion 310 of the bladder 300 may be formed above the bladder 300. In addition, the pole member 400 may be extended from the connection portion 310 below a central portion of the bladder 300. Thus, a user may easily grasp the pole member 400 together with the bladder 300.

The pole member 400 may be sealed at and connected to the first entrance 211 of the tank body 200 by a fitting member 430. To this end, a sealing member 440, such as an O-ring, and the like, may be disposed between the fitting member 430 and the end portion of the pole member 400.

Thus, the bladder 300 may be easily connected to the first entrance 211 of the tank body 200 together with the pole member 400.

A configuration of the fitting member 430 is not specifically limited, and the fitting member 430 may have any configuration allowing the pole member 400 to be sealed at and connected to the first entrance 211 of the tank body 200.

As illustrated in FIGS. 2 and 6, a communication hole 410 in communication with the first entrance 211 of the tank body 200 and the interior of the bladder 300 may be formed in the pole member 400. Thus, water may flow into the bladder 300 through the first entrance 211 and the communication hole 410 of the pole member 400. In addition, the water stored in the bladder 300 may flow out through the communication hole 410 of the pole member 400 and the first entrance 211.

In the meantime, in the case of the bladder 300, a thickness T1 of the lower surface may be greater than a thickness T2 of the upper surface and a thickness T3 of the side surface.

Thus, when the water stored in the bladder 300 flows out through the first entrance 211 of the tank body 200, the lower surface of the bladder 300 is not folded, so that the wrinkle may not be generated. However, an overall lower surface 300a of the bladder 300 only may be overlapped on the side surface of the bladder 300 in such a manner that the side surface of the bladder 300 is folded, as illustrated in FIG. 10.

Thus, since a wrinkle having a uniform form is repeatedly formed in the bladder 300, thereby reducing the number of wrinkles which are folded to have a different form and intersect each other, damage to the bladder 300 by the wrinkle may be prevented.

When water flows into the bladder 300 through the first entrance 211 of the tank body 200 and is stored in the bladder 300, the lower surface of the bladder 300 may first be unfolded from the side surface of the bladder 300. Subsequently, the bladder 300 may be unfolded to have a rough cylindrical form based on the lower surface of the bladder 300.

Thus, since the bladder 300 is folded and unfolded in a relatively uniform pattern, thereby reducing the number of wrinkles, damage to the bladder 300 by the wrinkle may be prevented.

The thickness T2 of the upper surface of the bladder 300 may be greater than the thickness T3 of the side surface of the bladder 300.

Thus, when the water stored in the bladder 300 flows out through the first entrance 211 of the tank body 200, the side surface of the bladder 300 may first be folded, as illustrated in FIG. 9. In this case, the bladder 300 may not be folded non-uniformly, but may be folded in a relatively uniform pattern. In other words, the number of intersecting wrinkles generated in the bladder 300 may be minimized. In addition, the number of wrinkles generated in the bladder 300 may be reduced.

Thus, damage to the bladder 300 by the wrinkle may be prevented. In other words, even in the case that the bladder 300 is repeatedly folded and unfolded, the bladder 300 may not easily be damaged. Furthermore, durability of the bladder 300 may be improved.

The bladder 300 may be cylindrical. However, the form of the bladder 300 is not specifically limited. As described above, the bladder 300 may have any form corresponding to the internal form of the tank body 200 and allowing water to flow thereinto by water flowing out of the interior of the tank body 200 or allowing water to flow out thereof by water flowing into the interior of the tank body 200.

The bladder 300 may be formed using a polyolefin elastomer. The polyolefin elastomer has excellent elasticity and a relatively high degree of fatigue fracture resistance compared with polyethylene, and the like. Thus, even in the case that the bladder 300 is repeatedly folded and unfolded by water flowing into and out of the bladder 300, damage thereto may be minimized. In other words, durability of the bladder 300 may be improved.

However, a material forming the bladder 300 is not specifically limited. The bladder 300 may include any material that can improve durability of the bladder 300.

The bladder 300 may be manufactured using blow molding. Thus, the bladder 300 may be manufactured in such a manner that the thickness T1 of the lower surface of the bladder 300 is thickest, the thickness T3 of the side surface is thinnest, and the thickness T2 of the upper surface is between the thickness T1 of the lower surface and the thickness T3 of the side surface.

A Method of Manufacturing a Bladder

As such, a method of manufacturing a bladder 300 using blowing molding may include mounting a material in S100, fixing a material in S200, and molding a bladder in S300, as illustrated in FIGS. 11 to 13.

In the mounting a material in S100, a bladder material BM may be mounted in a mold M. For example, the bladder material BM may be disposed between divided portions of the mold M, as illustrated in FIG. 11.

The bladder material BM may have at least one open side and may be cylindrical. Thus, in the molding a bladder in S300, air may be injected into the bladder material BM through the open side thereof.

However, a form of the bladder material BM is not specifically limited. The bladder material BM may have any form allowing air to be injected into the bladder material BM in the molding a bladder in S300.

In addition, the bladder material BM may be formed using a polyolefin elastomer. However, the bladder material BM is not specifically limited. The bladder material BM may be provided as any material improving durability of the bladder 300 manufactured using the bladder material BM.

In the fixing a material in S200, the bladder material BM may be fixed to the mold M. For example, the bladder material BM may be fixed to the mold M by combining the divided portions of a mold M, as illustrated in FIG. 12.

An opposite side to a side of the bladder material BM, on which air is injected in the molding a bladder in S300 may be fixed to the mold M.

In the molding a bladder in S300, air may be injected into the bladder material BM, thereby molding the bladder 300. To this end, hot air may be injected into the bladder material BM in the molding a bladder in S300.

Thus, the bladder material BM is melted and may be moved in the mold M, as illustrated in FIG. 13. A melted bladder material BM may be molded to be the bladder 300 by adhering to a surface of the mold M by air.

In the meantime, a relatively large amount of the melted bladder material BM may be moved to the opposite side to a side on which air is injected. Thus, a thickness T1 of a lower surface of the bladder 300, which is molded, may be thicker than a thickness T2 of an upper surface and a thickness T3 of a side surface. In addition, a relatively large amount of air may be moved to a side surface of the bladder material BM, rather than to other surfaces thereof. Thus, the thickness T2 of the upper surface of the bladder 300 may be thicker than the thickness T3 of the side surface.

[Water Treatment Apparatus—Use Example of Water Storage Tank]

Hereinafter, use of a water storage tank 100 according to an example in a water treatment apparatus 10, such as a water purifier, or the like, will be briefly described with reference to FIGS. 14 and 15.

FIGS. 14 and 15 are piping diagrams of a water treatment apparatus using a water storage tank and operations thereof according to an example.

A first entrance 211 in an example of the water storage tank 100 according to an example may be connected to a purified water line LPW, as illustrated in FIGS. 14 and 15. In addition, a second entrance 212 of the water storage tank 100 may be connected to an entrance line LEI.

As illustrated in FIG. 14, in a case in which a water discharge member 50 is closed, raw water having flowed in a raw water line LRW may pass through a first water purifying filter 31, a second water purifying filter 32, and a third water purifying filter 33, connected to each other by a connection line LC, thereby being filtered to be purified water.

In this case, a first pressure reducing valve 73 may be disposed in the connection line LC connecting the first water purifying filter 31 and the second water purifying filter 32, thereby reducing pressure of raw water to a predetermined required level of pressure.

Purified water filtered by the third water purifying filter 33 may flow in the purified water line LPW and may flow into the bladder 300 of the water storage tank 100 through the first entrance 211 of the water storage tank 100 to be stored therein.

Domestic water not filtered in the third water purifying filter 33 may be drained through a drain line LD including a domestic water valve 75.

In this case, a flow path changing valve 40 connected to a connection/discharging line LCE, a discharging line LE, the entrance line LEI, a domestic water line LLW, and a drain branch line LDS connects the entrance line LEI to the drain branch line LDS.

Thus, since water is stored in the bladder 300 of the water storage tank 100, the water stored in an interior of a tank body 200 of the water storage tank 100, such as domestic water, flows into the drain line LD through the entrance line LEI and the drain branch line LDS to be drained.

In this case, while domestic water passes through a second pressure reducing valve 74 disposed in the entrance line LEI, domestic water may flow with pressure thereof reduced to have a predetermined required level of pressure.

In a case in which the bladder 300 of the water storage tank 100 is filled with purified water, an automatic shut-off valve 60, disposed in the connection line LC connecting the second water purifying filter 32 to the third water purifying filter 33 and connected to the discharging line LE by a pressure transfer line LE, is closed.

Thus, raw water may not flow into the third water purifying filter 33, so that purified water may not flow into the bladder 300 of the water storage tank 100.

In addition, the purified water line LPW may include a first check valve 71 and a second check valve 72.

In the meantime, as illustrated in FIG. 15, in a case in which the water discharge member 50 is opened, the flow path changing valve 40 connects the domestic water line LLW to the entrance line LEI.

Thus, domestic water not filtered in the third water purifying filter 33 may flow into the interior of the tank body 200 through the domestic water line LLW, the entrance line LEI, and the second entrance 212.

In addition, purified water stored in the bladder 300 of the water storage tank 100 flows out through the first entrance 211, flows in the purified water line LPW, and flows into a fourth water purifying filter 34 connected to the purified water line LPW and the discharging line LE.

Purified water filtered while passing through the fourth water purifying filter 34 flows to the water discharge member 50 through the discharging line LE, the flow path changing valve 40, and the connection/discharging line LCE. Purified water may flow outwardly through the water discharge member 50 and may be supplied to a user.

However, the water storage tank 100 according to an example may be used in other devices besides the water treatment apparatus 10 described above.

As described above, in a case in which a water storage tank bladder, a method of manufacturing the same, a water storage tank including the same, and a water treatment apparatus including the water storage tank according to an example is used, a thickness of a lower surface of the water storage tank bladder may be thicker than a thickness of an upper surface and a thickness of a side surface. In addition, the number of wrinkles generated in the water storage tank bladder may be reduced, while the number of intersecting wrinkles generated in the bladder may be minimized. The water storage tank bladder may not be damaged by repeated folding and unfolding, while durability of the water storage tank bladder may be improved.

Furthermore, a pole member may be disposed in an interior of the bladder which water flows into and out of, and the bladder may be easily disposed in an interior of a tank body of the water storage tank.

In addition, the tank body of the water storage tank may include an upper body and a lower body covering an open lower portion of the upper body; a burr prevention portion may be formed in the lower body of the tank body; the bladder disposed in the interior of the tank body may not be damaged by a welding burr generated when the upper body and the lower body of the tank body are welded together; and the water storage tank may be easily combined with a housing of the water treatment apparatus.

In addition, the bladder disposed in the interior of the tank body of the water storage tank may have a form corresponding to an internal form of the tank body, and an external diameter of the bladder may be greater than an internal diameter of the tank body. In a case in which the bladder is filled with water, among surfaces of the bladder, surfaces, except for a surface disposed closest to the second entrance disposed in the tank body to allow water to flow into and out of the interior of the tank body, may adhere to an internal side surface of the tank body without being expanded therein. Even in the case that the bladder is filled with water, the bladder is stable, and back pressure may not be applied to the first entrance connected to the bladder to allow water to flow into and out and disposed in the tank body. Water may easily flow into the interior of the tank body through the second entrance.

The water storage tank bladder, the method of manufacturing the same, the water storage tank including the same, and the water treatment apparatus including the water storage tank, described above, are not limited to a composition of an example described above. An overall component or a portion of examples may selectively be combined so that the examples described above may have various modified examples.

While exemplary embodiments have been shown and described above, it will be apparent to those skilled in the art that modifications and variations could be made without departing from the scope of the present invention as defined by the appended claims.

The invention claimed is:

1. A water storage tank, comprising:
   a tank body including a first entrance and a second entrance into and out of which water flows; and
   a bladder disposed in an interior of the tank body to be connected to the first entrance and into or out of which water flows through the first entrance, while water flows out of or into the interior of the tank body through the second entrance,
   wherein the tank body comprises an upper body including the first entrance and the second entrance and a lower body connected to the upper body, in order to cover an open lower portion of the upper body,
   wherein a welding groove is formed in a lower end portion of the upper body, and a welding protrusion inserted into the welding groove is formed in an upper end portion of the lower body, and
   wherein a burr prevention portion, preventing a welding burr generated during welding from being exposed in the interior of the tank body, is formed in the upper end portion of the lower body.

2. The water storage tank of claim 1, wherein a pole member is disposed in an interior of the bladder.

3. The water storage tank of claim 2, wherein a connection portion connected to the first entrance is formed in the bladder, and an end portion of the pole member is connected to the connection portion.

4. The water storage tank of claim 1, wherein the burr prevention portion is formed on an internal side of the welding protrusion, and a portion of the lower end portion of the upper body is inserted between the burr prevention portion and the welding protrusion.

5. The water storage tank of claim 4, wherein the burr prevention portion is extended in an upward direction to be higher than the welding protrusion.

6. The water storage tank of claim 5, wherein a surface of the burr prevention portion, facing the lower end portion of the upper body is formed to be a stepped surface.

7. The water storage tank of claim 6, wherein the stepped surface is formed in such a manner that space between the stepped surface and the lower end portion of the upper body widens in an upward direction.

8. The water storage tank of claim 1, wherein, even in the case that the bladder is filled with water, the bladder is stable, and back pressure is not applied to the first entrance,
   wherein the bladder has a form corresponding to an internal form of the tank body, and
   wherein, in a case in which the bladder is filled with water, among surfaces of the bladder, surfaces, except for a surface disposed closest to the second entrance, adhere to an internal side surface of the tank body without being expanded.

9. The water storage tank of claim 8, wherein an external diameter of the bladder is greater than an internal diameter of the tank body.

10. The water storage tank of claim 8, wherein the surface of the bladder, disposed closest to the second entrance, is disposed to be spaced apart from an internal side surface of the tank body by a predetermined interval.

11. A water treatment apparatus, comprising:
    a water storage tank of claim 1; and
    a housing combined with the water storage tank.

12. The water treatment apparatus of claim 11, wherein a first connection hole is provided as a plurality of first connection holes disposed with a predetermined angle between respective holes among the plurality of first connection holes in a lower body included in a tank body of the water storage tank, wherein a second connection hole, corresponding to the first connection holes and having an arc form, is provided as a plurality of second connection holes disposed with a predetermined angle between respective holes among the plurality of second connection holes in the housing.

13. The water treatment apparatus of claim 12, wherein a number of the second connection hole is half a number of the first connection hole.

14. The water storage tank of claim 1, wherein a thickness of a lower surface of the bladder is greater than a thickness of an upper surface and a thickness of a side surface of the bladder.

15. The water storage tank of claim 14, wherein the thickness of the upper surface of the bladder is greater than the thickness of the side surface of the bladder.

\* \* \* \* \*